(12) United States Patent
Meixner et al.

(10) Patent No.: US 11,173,551 B2
(45) Date of Patent: Nov. 16, 2021

(54) OFFSET CONTACTS ON A RECHARGEABLE BATTERY

(71) Applicant: Hilti Aktiengesellschaft, Schaan (LI)

(72) Inventors: Ralf Meixner, Germaringen (DE); Johannes Stempfhuber, Utting am Ammersee (DE)

(73) Assignee: Hilti Aktiengesellschaft, Schaan (LI)

( * ) Notice: Subject to any disclaimer, the term of this patent is extended or adjusted under 35 U.S.C. 154(b) by 204 days.

(21) Appl. No.: 16/608,104

(22) PCT Filed: Apr. 19, 2018

(86) PCT No.: PCT/EP2018/060064
§ 371 (c)(1),
(2) Date: Oct. 24, 2019

(87) PCT Pub. No.: WO2018/197335
PCT Pub. Date: Nov. 1, 2018

(65) Prior Publication Data
US 2020/0094329 A1 Mar. 26, 2020

(30) Foreign Application Priority Data

Apr. 26, 2017 (EP) .................................... 17168102

(51) Int. Cl.
*B23B 45/02* (2006.01)
*B25F 5/02* (2006.01)
(Continued)

(52) U.S. Cl.
CPC ............... *B23B 45/02* (2013.01); *B25F 5/02* (2013.01); *H01M 10/425* (2013.01);
(Continued)

(58) Field of Classification Search
USPC ........................................................ 320/114
See application file for complete search history.

(56) References Cited

U.S. PATENT DOCUMENTS

| 4,084,123 A * | 4/1978 | Lineback | H02J 7/0045 320/111 |
| 2008/0272760 A1 | 11/2008 | Wiesner et al. | |

(Continued)

FOREIGN PATENT DOCUMENTS

| DE | 102010063077 A1 | 6/2012 |
| GB | 2486565 A | 6/2012 |

OTHER PUBLICATIONS

International Search Report of PCT/EP2018/060064, dated May 28, 2018.

*Primary Examiner* — Mohammed Alam
(74) *Attorney, Agent, or Firm* — Davidson, Davidson & Kappel, LLC

(57) ABSTRACT

A power tool includes a receiving device having at least one first and second power consumption element. A power supply unit connectable to the power tool includes a connecting device having at least one first and second power output element, the receiving device being designed to receive and hold the connecting device, so that the power consumption elements and the power output elements are connectable. Both the first and second power consumption elements have a positive pole as well as a negative pole, and both the first and second power output elements have a positive pole as well as a negative pole. The positive pole of the first power consumption element and the positive pole of the second power consumption element as well as the negative pole of the first power consumption element and the negative pole of the second power consumption element are positioned at a distance from each other in at least one first and second direction.

5 Claims, 6 Drawing Sheets

(51) Int. Cl.
*H01M 10/42* (2006.01)
*H01M 50/213* (2021.01)

(52) U.S. Cl.
CPC ..... *H01M 50/213* (2021.01); *B23B 2260/024* (2013.01); *H01M 2010/4278* (2013.01); *H01M 2220/30* (2013.01)

(56) References Cited

U.S. PATENT DOCUMENTS

| | | |
|---|---|---|
| 2011/0012560 A1 | 1/2011 | Sakakibara et al. |
| 2015/0151423 A1 | 6/2015 | Burger et al. |
| 2020/0094329 A1* | 3/2020 | Meixner ............. H01M 10/425 |
| 2020/0127339 A1* | 4/2020 | Nakano ............... H01M 10/443 |
| 2021/0194067 A1* | 6/2021 | Klee ................... H01M 50/247 |

* cited by examiner

OFFSET CONTACTS ON A RECHARGEABLE BATTERY

The present invention relates to a power tool, for example a power drill, which includes a receiving device having at least one first and second power consumption element, and including a power supply unit connectable to the power tool, for example a rechargeable battery, which includes a connecting device, the connecting device having at least one first and second power output element, the receiving device being designed to receive and hold the connecting device, so that the power consumption elements and the power output elements are connectable to each other for establishing an electrical connection.

BACKGROUND

Cordless power tools may be operated with the aid of a rechargeable battery for power supply purposes. The rechargeable battery may be removed from the power tool to be able to recharge it with electrical current in a charging device.

Due to the continuous further development of cell and rechargeable battery technology, cordless power tools having increasingly higher power ratings may be implemented. For these power increases, more and more electrical energy or electrical current must necessarily be made available from the rechargeable batteries of the power tool. A large number of contact elements are now used as the interface between the rechargeable battery and the power tool to transmit the electrical energy.

To keep the dimensions or the size of the interface between the rechargeable battery and the power tool as small and compact as possible, the individual contact elements are preferably positioned close to each other on the interface. Due to the high energy flow or the high electrical currents flowing through the contact elements from the rechargeable battery to the power tool, undesirable heating of the contact elements may occur. An uncontrolled heating of this type may result in a higher resistance at the contact elements and may also result in damage to the contact elements.

In conventional, battery-operated power tools, this impairs not only the handling but also the current carrying capacity of the contact elements.

SUMMARY OF THE INVENTION

It is an object of the present invention to provide a power tool which includes an improved interface between the rechargeable battery and the power tool, with the aid of which the aforementioned problems may be solved and a greater current carrying capacity of the contact elements may be achieved.

The present invention provides a power tool, for example a power drill, which includes a receiving device having at least one first and second power consumption element, and including a power supply unit connectable to the power tool, for example a rechargeable battery, which includes a connecting device, the connecting device having at least one first and second power output element, the receiving device being designed to receive and hold the connecting device, so that the power consumption elements and the power output elements are connectable to each other for establishing an electrical connection.

According to the present invention, it is provided that both the first and the second power consumption element have a positive pole as well as a negative pole, and both the first and the second power output element have a positive pole as well as a negative pole, so that in each case one positive pole is connected to one positive pole, and one negative pole is connected to one negative pole when the receiving device and the connecting device are connected to each other, the positive pole of the first power output element and the positive pole of the second power output element, the positive pole of the first power consumption element and the positive pole of the second power consumption element, the negative pole of the first power output element and the negative pole of the second power output element, as well as the negative pole of the first power consumption element and the negative pole of the second power consumption element being positioned at a distance from each other in at least one first and second direction.

It is provided that the receiving device is designed to receive electrical energy and/or data and signals. The receiving device is thus a type of receiver for the electrical energy or the current as well as for data and signals transmitted by the power supply unit to the power tool.

A large number of contact elements on the interface make it necessary to apply a high pressure when the rechargeable battery and the power tool are connected to each other. The reason for this is that the mechanical resistance of multiple contact elements is overcome, in particular if these contact elements are designed in the form of terminals having electrically deformable plates for receiving pin-like plugs.

According to one advantageous specific embodiment of the present invention, it may therefore be provided that the positive pole of the first power output element and the positive pole of the second power output element, the positive pole of the first power consumption element and the positive pole of the second power consumption element, the negative pole of the first power output element and the negative pole of the second power output element as well as the negative pole of the first power consumption element and the negative pole of the second power consumption element are positioned at a distance from each other in at least one third direction. Due to the distances between the individual power output elements and power consumption elements, an improved heat dissipation from the power output elements and power consumption elements may be easily achieved.

According to another advantageous specific embodiment of the present invention, in may be provided that a spring element is provided in each case on the positive pole and the negative pole of the power output elements, whereby the positive pole and the negative pole are movable in a first and second direction as well as relative to the positive pole and negative pole of the power consumption elements, making it possible to counteract a relative movement between the particular positive pole and negative pole of the power output elements and the positive pole and negative pole of the power consumption elements when the power output elements and the power consumption elements are connected to each other. A relative movement between the particular positive poles and negative poles may be reduced hereby, thus making it possible to counteract the vibration-induced wear on the positive poles and the negative poles.

According to an alternative specific embodiment, however, it is also possible to design the spring element as a component having an elastically deformable material. Elastomer is possible as the material. This makes it easily possible to counteract a vibration-induced movement of the contact element in multiple directions, i.e. not only in the direction of or against the direction of the receiving element.

BRIEF DESCRIPTION OF THE DRAWINGS

Other advantages result from the following description of the figures. The figures illustrate different exemplary embodiments of the present invention. The figures, the description and the claims contain numerous features in combination. Those skilled in the art will advantageously also consider the features individually and combine them to form other meaningful combinations.

DETAILED DESCRIPTION

Figure 1:
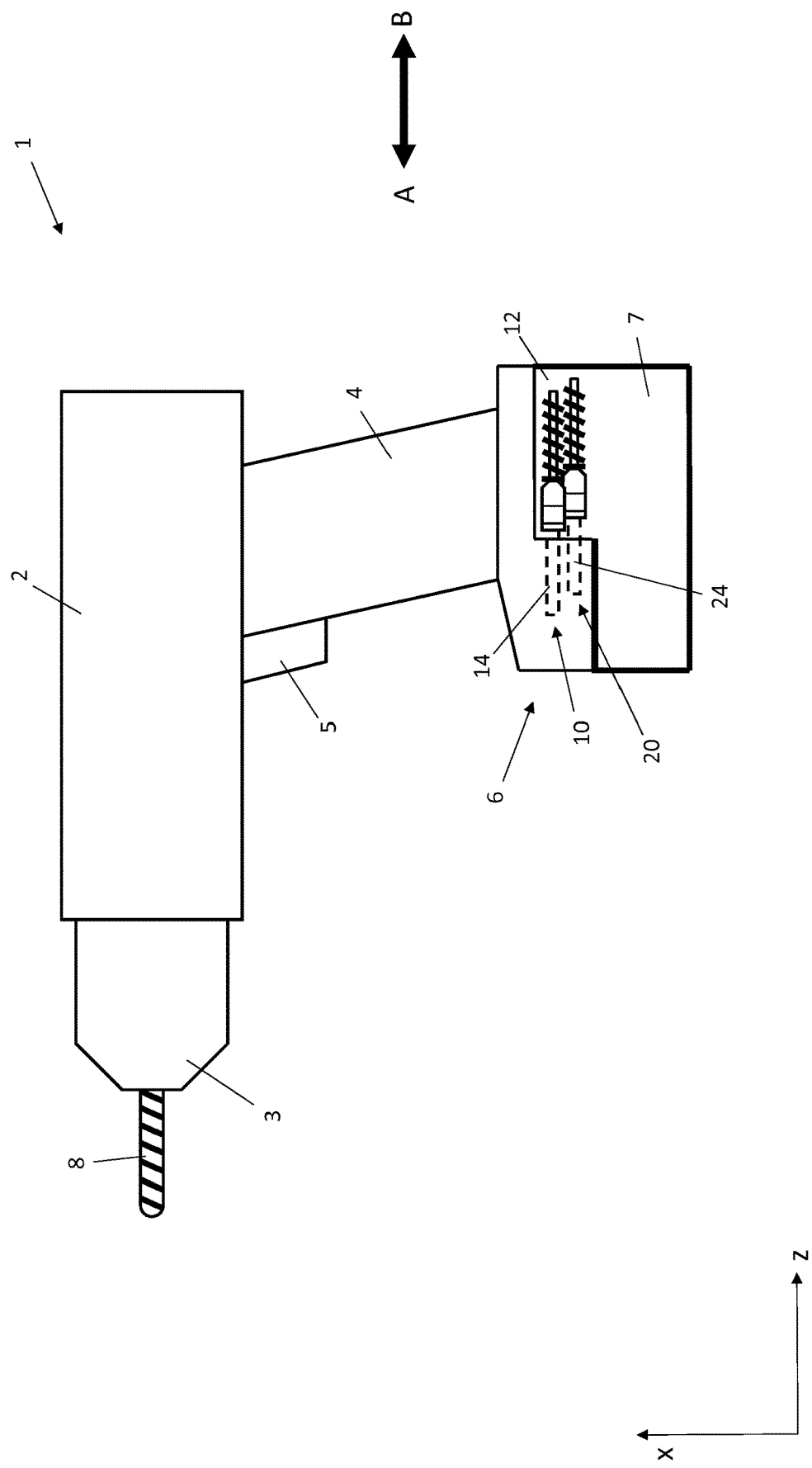
FIG. 1 shows a side view of a power tool according to the present invention, including a rechargeable battery connected to the power tool.
Figure 2:
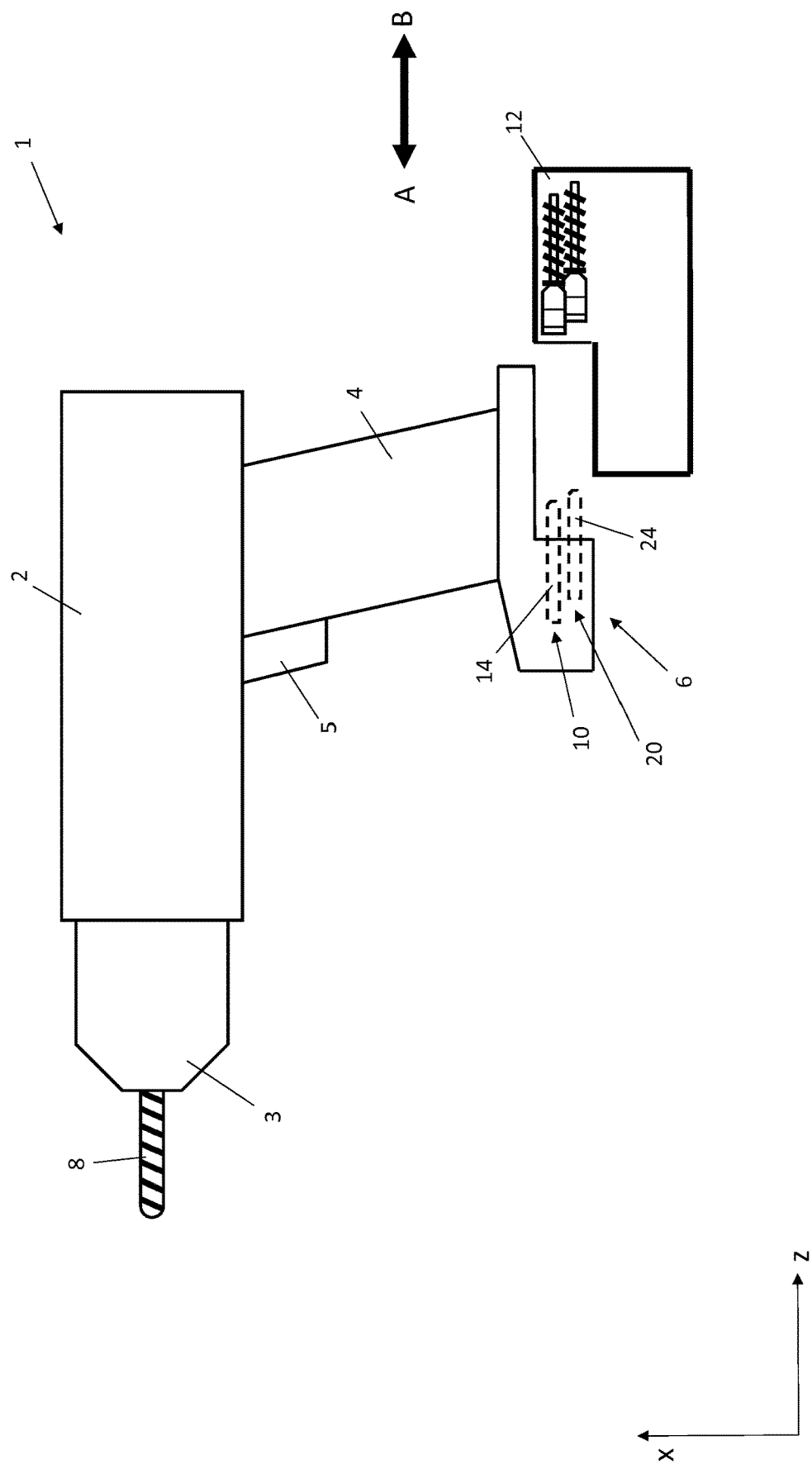
FIG. 2 shows another side view of a power tool according to the present invention, including a rechargeable battery removed from the power tool.

An example of a specific embodiment of power tool 1 according to the present invention is illustrated in FIGS. 1 and 2.

Power tool 1 is designed in the form of a power drill. However, it is also possible for power tool 1 to be a hammer drill, a circular saw or the like.

Power tool 1 illustrated in FIGS. 1 and 2 essentially includes a housing 2, a tool holder 3 and a handle 4, which has an activation switch 5. In addition, power tool 1 includes a receiving device 6 for a power supply unit 7. As illustrated in FIGS. 1 and 2, power supply unit 7 is designed as a rechargeable battery, also referred to as a battery.

FIG. 1 shows a state in which battery 7 is connected to power tool 1. For this purpose, battery 7 is pushed in arrow direction A onto receiving device 6. As illustrated in FIG. 2, battery 7 may be removed again from receiving device 6, and thus from power tool 1, according to arrow direction B.

Housing 2 has a first end 2a and a second end 2b. Tool holder 3 is positioned on a first end 2a of housing 2. Tool holder 3 is used to receive and detachably hold a tool 8. Tool 8 illustrated in FIGS. 1 and 2 is designed in the form of a drill.

Handle 4 has activation switch 5, a first end 4a and a second end 4b. Activation switch 5 is used to actuate power tool 1. First end 4a of handle 4 is fastened to a second end 2b of housing 2 and below housing 2.

Figure 3:
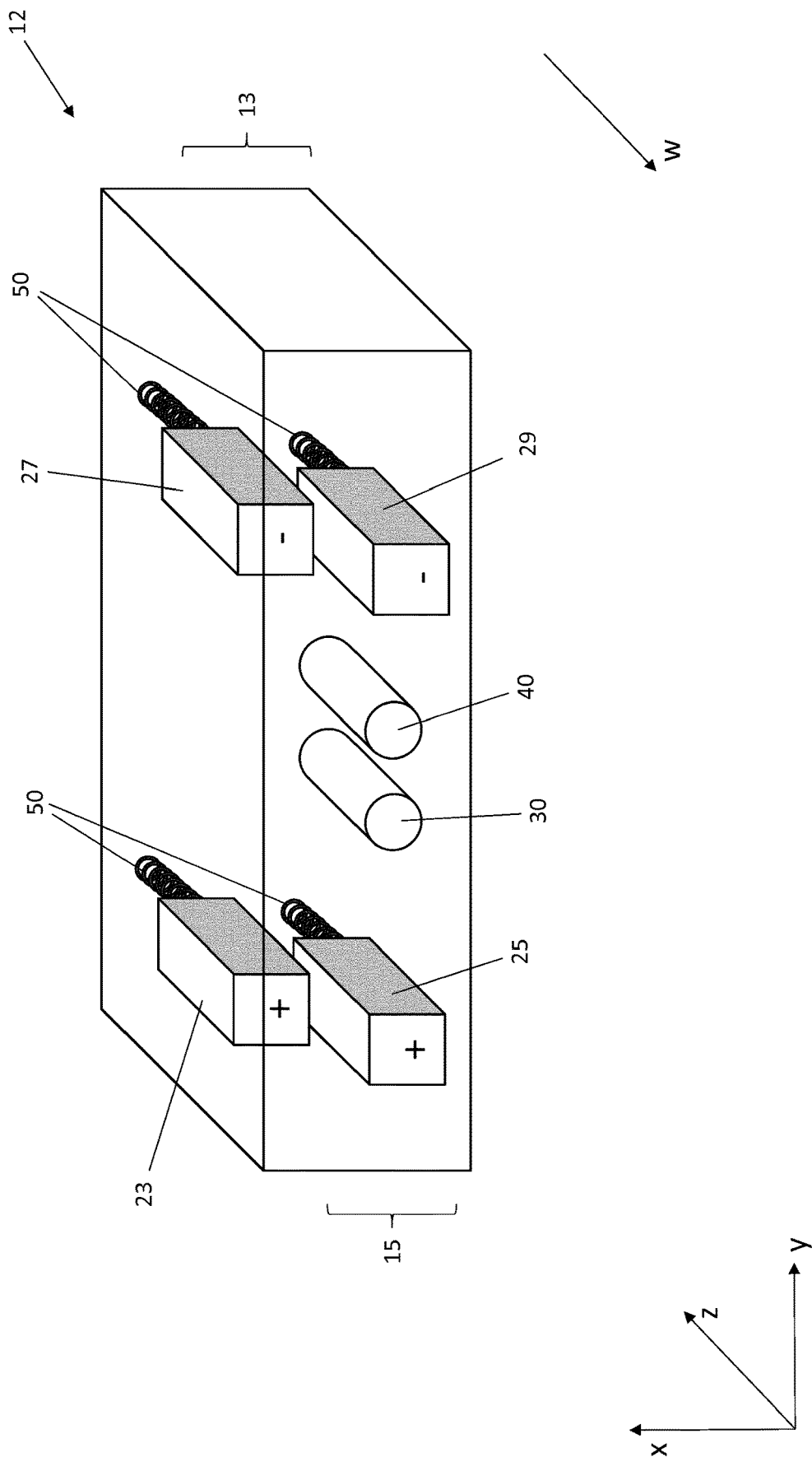
FIG. 3 shows a perspective view of a connecting device according to a first specific embodiment.
Figure 4:
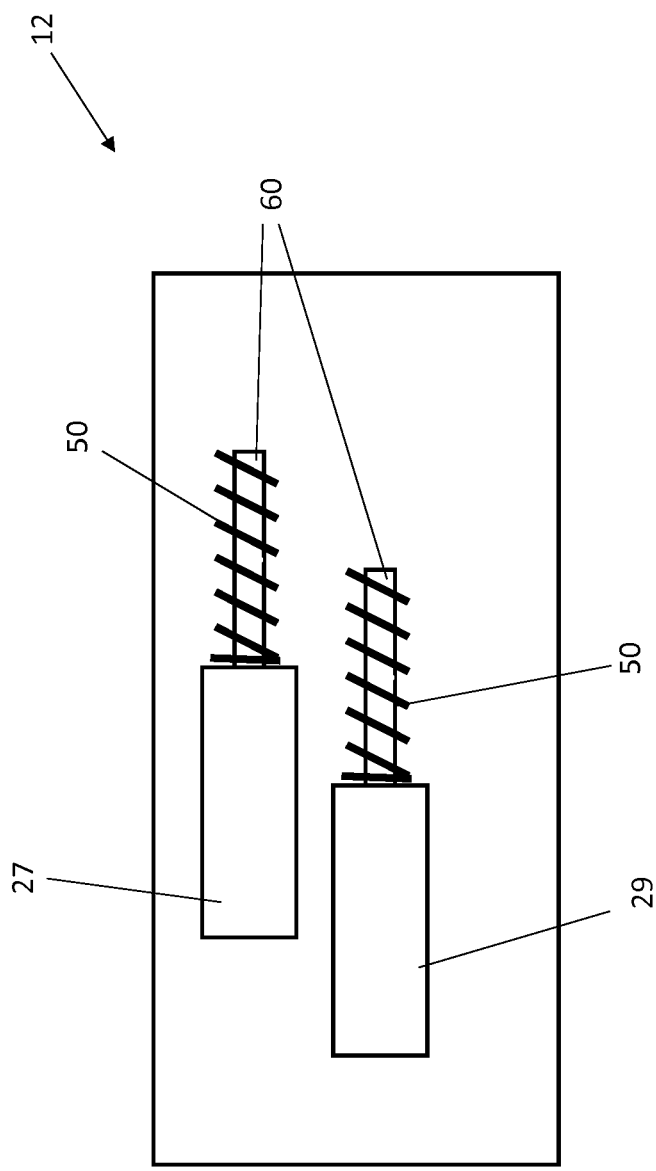
FIG. 4 shows a side view of the connecting device of the rechargeable battery according to the first specific embodiment.

Receiving device 6 for power supply unit 7 designed as a rechargeable battery is positioned on second end 4b of handle 4. As illustrated in FIGS. 3 and 4, receiving device 6 includes a first power consumption element 10 and a second power consumption element 20 as well as two data receiving elements. The two data receiving elements are positioned in receiving device 6 between first power consumption element 10 and second power consumption element 20 and is thus in the middle of receiving device 6. The data receiving elements are only indicated in the figures.

In addition, first power consumption element 10 has a positive pole and a negative pole 14, and second power consumption element 20 has a positive pole and a negative pole 24. The positive poles are situated in parallel to each other as well as offset one above the other and are located on a first side of receiving device 6. Negative poles 14, 24 are also situated in parallel to each other as well as offset one above the other and are located on a second side of receiving device 6. The positive poles and negative poles 14, 24 are used to establish an electrical connection as well as to actually receive the electrical current from battery 7 and conduct it to an electric consumer in power tool 1. The positive poles are not illustrated in FIGS. 1 and 2.

The power supply unit 7 designed as a battery essentially includes a housing 11, in which a number of individual, interconnected power storage cells, also referred to as battery cells, are positioned. With the aid of the battery cells, electrical energy may be stored in battery 7. The battery cells are not illustrated in the figures.

A connecting device 12 is positioned on an upper end of housing 11. Connecting device 12 included a first power output element 13 and a second power output element 15. As illustrated in FIG. 3, first power output element 13 is positioned above second power output element 15 (e.g. against arrow direction X).

In addition, first power output element 13 has a positive pole 23 and a negative pole 27, and second power output element 15 has a positive pole 25 and a negative pole 29. Positive poles 23, 25 are situated in parallel to each other as well as offset one above the other and are located on a first side 6a of connecting device 12. Negative poles 27, 29 are also situated in parallel to each other as well as offset one above the other and are located on a second side 6b of receiving device 6. Positive poles 23, 25 and negative poles 27, 29 are also used to establish an electrical connection as well as to actually output the electrical current (or the electrical energy) from battery 7 to power tool 1.

However, according to an alternative specific embodiment, which is not illustrated, it is also possible that more than two power output elements 13, 15, each having more than one positive pole 23, 25 and one negative pole 27, 29, are included in connecting device 12.

It should be noted that the number of power output elements 13, 15 matches the number of power consumption elements 10. Two data output elements 30, 40 are positioned between the two power output elements 13, 15 (cf. FIGS. 3 and 4). The two data output elements 30, 40 are designed in such a way that they are connectable to the two data receiving elements 30, 40 of receiving device 6.

According to a first specific embodiment of the present invention, positive pole 23 of first power output element 13 is situated offset in a direction Z and X with respect to positive pole 25 of second power output element 15.

Likewise, negative pole 27 of first power output element 13 is situated offset in a direction Z and X with respect to negative pole 29 of second power output element 15.

Power consumption elements 10 of receiving device 6 and power output elements 13, 15 of connecting device 12 may be detachably connected to each other. The positive poles of the power consumption elements are connected to positive poles 23, 25 of power output elements 13, 15, and negative poles 14, 24 of power consumption elements 10 are connected to negative poles 27, 29 of power output elements 13, 15 to form an electrical contacting. Due to the connection between particular positive poles 23, 25 and negative poles 14, 24, 27, 29, the electrical energy (or current) stored in the battery cells may be conducted from battery 7 to receiving device 6. The electrical energy is subsequently passed on to electrical consumers in power tool 1.

Due to the offset arrangement of positive poles 23, 25 and negative poles 27, 29 of power output elements 13, 15, it is absolutely necessary for the positive poles and negative poles 14, 24 of power consumption elements 10 to be situated in an offset manner. It should be noted that, according to the exemplary embodiment indicated in FIGS. 3 and 4, positive pole 23 of first power output element 13 is situated offset by the same distance in direction Z that the positive pole of the first power consumption element is situated offset in direction Z. Likewise, negative pole 27 of first power output element 13 is situated offset by the same distance in direction Z that negative pole 14 of first power consumption element 10 is offset in direction Z. Otherwise, the corresponding poles are not connectable to each other when receiving device 6 and connecting device 12 are joined.

Figure 5:
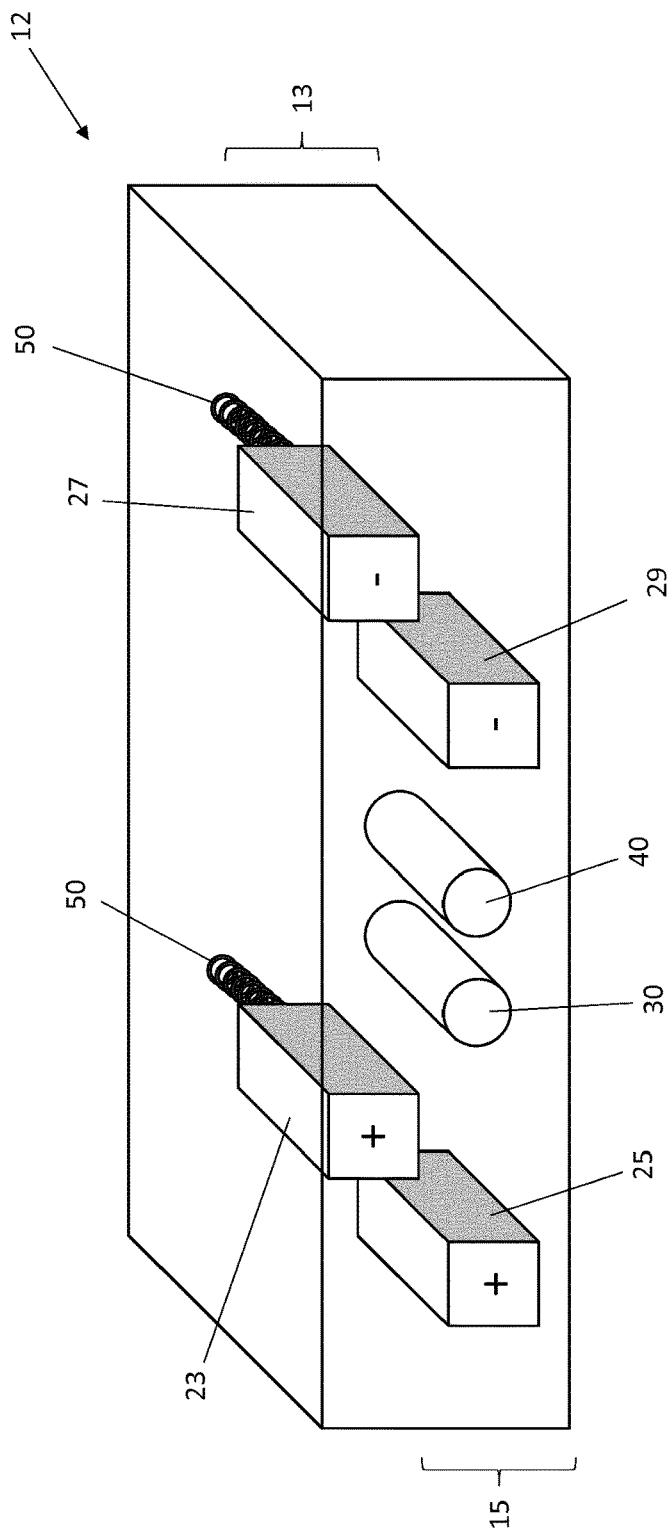
FIG. 5 shows a perspective view of the connecting device of the rechargeable battery according to a second specific embodiment.
Figure 6:
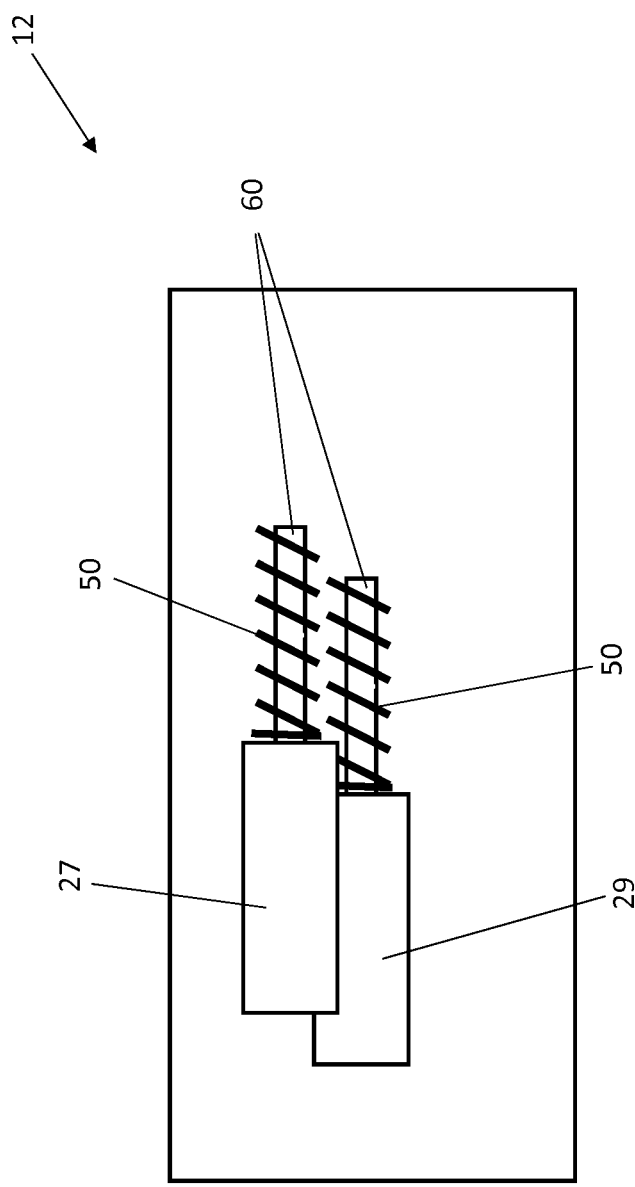
FIG. 6 shows a side view of the connecting device of the rechargeable battery according to the second specific embodiment.

FIGS. 5 and 6 show a second exemplary embodiment of the present invention, according to which positive pole 23 of first power output element 13 is situated offset in a direction Z, X and Y with respect to positive pole 25 of second power output element 15. Likewise, negative pole 27 of first power output element 13 is situated offset in a direction Z, X and Y with respect to negative pole 29 of second power output element 15. Correspondingly, the positive poles and negative poles 14, 24 of power consumption elements 10 of receiving device 6 are also situated offset in directions Z, X and Y, so that the positive poles and negative poles of power consumption elements 10 of receiving device 6 and positive poles 23, 25 as well as negative poles 27, 29 of power output elements 13, 15 of connecting device 12 are connected to each other when receiving device 6 and connecting device 12 are joined.

An electric motor for generating a torque is positioned in housing 2. The electric motor is thus an electric consumer. The torque generated in the electric motor is transmitted to tool holder 3 via an output shaft and a transmission. Tool 8 is rotated with the aid of the transmitted torque. The electric motor, the output shaft and the transmission are not illustrated in the figures.

According to another specific embodiment of the present invention, it may be provided that individual positive poles 23, 25 and negative poles 27, 29 of power output elements 13, 15 are each connected to a spring element 50. As is indicated, in particular, in FIGS. 3 through 6, spring element 50 is positioned behind particular positive poles 23, 25 and negative poles 27, 29 in direction Z. Spring element 50 extends in direction Z. As illustrated, in particular, in FIGS. 4 and 6, particular spring element 50 is positioned around a litz wire 60. Each positive pole 23, 25 and negative pole 27, 29 has a litz wire 60 of this type. Litz wires 60 are used to transmit the electrical energy from the battery cells to particular positive pole 23, 25 and negative pole 27, 29.

Moreover, individual positive poles 23, 25 and negative poles 27, 29 are located in a contact chamber. Particular spring elements 50 are positioned in the contact chambers in such a way that the particular spring force of spring elements 50 presses positive poles 23, 25 and negative poles 27, 29 against direction Z. The contact chambers cells are not illustrated in the figures.

Moreover, each positive pole 23, 25 and negative pole 27, 29 includes a first and second contact blade. The contact blades are provided with a movable or flexible design, so that the first contact blade may be reversibly pivoted in a first direction, and the second contact blade may be reversibly pivoted in the other direction. The mobility of the contact blades is used to be able to accommodate particular positive poles 23, 25 and negative poles 27, 29 of power output elements 13, 15 of connecting device 12, so that each positive pole 23, 25 and each negative pole 27, 29 rest against each other when battery 7 is properly connected to power tool 1 (cf. FIG. 1).

With the aid of spring element 50, vibration-induced relative movements (in arrow directions A and B), which arise when power tool 1 is in use, are compensated for between particular positive poles 23, 25 and negative poles 14, 24, 27, 29.

What is claimed is:

1. A power tool comprising:
   a receiving device having at least one first power consumption element and at least one second power consumption element; and
   a power supply unit connectable to the receiving device and including a connecting device, the connecting device having at least one first power output element and at least one second power output element;
   the receiving device being designed to receive and hold the connecting device, so that the first and second power consumption elements and the first and second power output elements are connectable to each other to establish an electrical connection,
   both the first and the second power consumption elements having a positive pole as well as a negative pole, and both the first and the second power output elements having a positive pole as well as a negative pole, so that in each case one respective positive pole is connected to one positive pole, and one respective negative pole is connected to one negative pole when the receiving device and the connecting device are connected to each other, the positive pole of the first power output element and the positive pole of the second power output element, the positive pole of the first power consumption element and the positive pole of the second power consumption element, the negative pole of the first power output element and the negative pole of the second power output element as well as the negative pole of the first power consumption element and the negative pole of the second power consumption element being positioned at a distance from each other in at least one first and second direction.

2. The power tool as recited in claim 1 wherein the positive pole of the first power output element and the positive pole of the second power output element, the positive pole of the first power consumption element and the positive pole of the second power consumption element, the negative pole of the first power output element and the negative pole of the second power output element as well as the negative pole of the first power consumption element and the negative pole of the second power consumption element are positioned at a distance from each other in at least one third direction.

3. The power tool as recited in claim 1 further comprising a spring element provided in each case on the positive pole and the negative pole of the first and second power output elements, whereby the positive pole and the negative pole of the first and second power output elements are movable in a first and second direction as well as relative to the positive pole and negative pole of the power consumption elements, making it possible to counteract a relative movement between the particular positive pole and negative pole of the power output elements and the positive pole and negative pole of the power consumption elements when the power output elements and the power consumption elements are connected to each other.

4. A power drill comprising the power tool as recited in claim 1.

5. The power tool as recited in claim 1 wherein the power supply unit is a rechargeable battery.

* * * * *